United States Patent [19]

Petrow et al.

[11] 4,166,143
[45] Aug. 28, 1979

[54] CONTROL OF THE INTERACTION OF NOVEL PLATINUM-ON-CARBON ELECTROCATALYSTS WITH FLUORINATED HYDROCARBON RESINS IN THE PREPARATION OF FUEL CELL ELECTRODES

[75] Inventors: Henry G. Petrow, Watertown; Robert J. Allen, Saugus, both of Mass.

[73] Assignee: Prototech Company, Newton, Mass.

[21] Appl. No.: 761,976

[22] Filed: Jan. 24, 1977

[51] Int. Cl.$^2$ ............... H01M 4/88; H01M 4/92; H01M 4/96; B01J 23/4
[52] U.S. Cl. ............... 427/115; 252/182.1; 252/425.3; 252/430; 427/125; 429/42
[58] Field of Search ............ 252/425.3, 430, 447, 252/511, 182.1, 326; 429/42; 427/115, 125; 210/51, 52; 264/105, 122

[56] References Cited

U.S. PATENT DOCUMENTS

| 2,878,353 | 3/1959 | Ely, Jr. et al. | 264/105 |
| 3,297,668 | 1/1967 | Berg et al. | 210/51 |
| 3,306,779 | 2/1967 | Flannery et al. | 429/42 |
| 3,388,004 | 6/1968 | Rosenblatt | 252/430 |
| 3,933,684 | 1/1976 | Petrow et al. | 252/447 |
| 4,035,259 | 7/1977 | Casale | 210/52 |
| 4,043,933 | 8/1977 | Breault et al. | 429/42 |
| 4,044,193 | 8/1977 | Petrow et al. | 429/42 |

Primary Examiner—P. E. Konopka
Attorney, Agent, or Firm—Rines and Rines

[57] ABSTRACT

In the repeated production of a fuel cell component consisting of a uniform mixture of an electrocatalyst and a wetproofing agent, an aqueous colloidal fluorinated hydrocarbon resin dispersion is rapidly and reproducibly flocculated, preferably in less than 5 minutes, in the presence of an aqueous suspension of a novel platinum-on-carbon electrocatalyst by means of a polycationic salt solution, the salt concentration being preferably between $10^{-3}$ and $10^{-6}$ molar.

6 Claims, No Drawings

CONTROL OF THE INTERACTION OF NOVEL PLATINUM-ON-CARBON ELECTROCATALYSTS WITH FLUORINATED HYDROCARBON RESINS IN THE PREPARATION OF FUEL CELL ELECTRODES

This invention relates to the preparation of a critical component of fuel cell electrodes, said component consisting of a substantially uniform mixture of a novel platinum-on-carbon electrocatalyst and a wet-proofing fluorinated hydrocarbon resin, for example tetrafluoro polyethylene, sold under the trademark and herein referred to as Teflon, and more particularly to the control and acceleration of the rate of substantially complete flocculation of finely divided Teflon particles from a colloidal aqueous dispersion thereof, with and in the presence of finely divided carbon having deposited thereon platinum particles substantially all 15–25 Å in particle size.

The function of a platinum-on-carbon electrocatalyst-Teflon mixture as a component of porous fuel cell electrodes in hydrogen-air fuel cells with liquid electrolytes (e.g. phosphoric acid) is well known in the art; the platinum on the electrically-conducting carbon catalyzes the ionization of the gases, i.e. hydrogen and oxygen, and the Teflon wetproofs the electrode by preventing or minimizing the "flooding" of the pores of the electrode by the electrolyte to insure rapid diffusion of the gases to the catalytic sites.

Electrocatalyst-Teflon mixtures have commonly been prepared by mixing, usually at slightly above room temperatures, platinum black or a conventional platinum-bearing carbon in finely-divided form with an aqueous colloidal negatively charged hydrophobic dispersion of Teflon containing Teflon particles typically 0.05–0.5 microns in size, the dispersion being stabilized by a non-ionic wetting agent such as, for example, a polyether sold under the trade name Triton X-100 by Rohm and Haas Co., having the structure of $C_8H_{16}(C_6H_4)O-(C_2H_4O)_{9.5}H$ as reported in "Chemistry and Physics of Interfaces," American Chemical Society Publication, 1965, p. 67, Table 1 (reprinted from Ind. and Eng. University, Sept. 1964–Sept. 1965).

Platinum-on-carbon electrocatalysts of the prior art, such as are prepared, for example, by impregnation of a finely-divided high surface area carbon with an aqueous solution of a platinum salt, e.g. chloroplatinic acid, followed by evaporation, drying and activation (e.g. by heat or hydrogen reduction) or the like, have deposits on the carbon of platinum crystallites varying in size over a wide range, with most of the said crystallites being far in excess of 25 Å in size. When these conventional plantinum-on-carbon electrocatalysts are combined with a wetproofing agent such as Teflon, as above described, the resulting mixture is said, according to P. Stonehart and G. Kohlmayr (U.S. Ser. No. 696,334), to be uneven in that it contains large aggregates of platinum-on-carbon particles of varying dimensions in random admixture with Teflon, which aggregates affect adversely the performance of fuel cell electrodes made from the said uneven mixture.

To overcome this problem, it was earlier proposed by P. Stonehart and G. Kohlmayr (U.S. patent application Ser. No. 696,334) to add a "cationic surfactant" in the form of a polyvalent metal oxide, a sol of a polyvalent metal oxide or a solution of a salt of a polyvalent metal oxide, in the preparation of the above-described conventional electrocatalyst-Teflon mixture. According to Stonehart and Kohlmayr (U.S. Ser. No. 696,334), provided that the said polyvalent metal of the surfactant is at least trivalent, such additives, when used at a proper pH, are said to result in an electrocatalyst-Teflon mixture from which electrodes of significantly improved performance have been made, presumably because the aggregation of large particles is minimized thereby yielding a more uniform mixture.

In recent years we have prepared novel platinum-on-carbon electrocatalysts comprising a high surface area carbon having deposited thereon platinum particles substantially all in the range of 15 Å to 25 Å in size, for example as described in our British Patent No. 1357494.

When these novel electrocatalysts, referred to as 15 Å–25 Å platinum-on-carbon electrocatalysts in this specification and the appended claims, are combined with a wetproofing agent, for example by the technique described above, and the resultant mixture is then incorporated into a fuel cell electrode by conventional means, the electrode performance (with a very low platinum loading of no more than 0.5mg/cm$^2$ of electrode area) is outstanding, as shown in our British Patent No. 1357494, demonstrating that our said novel electrocatalyst is indeed vastly superior to the above-described conventional platinum-electrocatalysts of the prior art. We have found that the addition of a tri-or tetravalent surfactant during the preparation of the 15 Å–25 Å platinum-on-carbon electrocatalyst-Teflon mixture does not enhance significantly the already excellent performance of a fuel cell electrode comprising the same; but we have encountered a different problem in the preparation of said mixture.

Upon contacting a 15 Å–25 Å platinum-on-carbon electrocatalyst with an aqueous colloidal Teflon dispersion, flocculation of the colloid occurs and the Teflon particles are "taken up" by the platinum-bearing carbon particles, forming the desired substantially-uniform electrocatalyst-Teflon mixture. However, we have found that the higher the platinum content of the carbon, in the preferred range from 5% to 25% by weight Pt, based on the weight of carbon plus platinum, the slower the flocculation and the greater the tendency toward incomplete coagulation of the Teflon; and that carbon alone causes relatively fast Teflon flocculation, but that the rate and degree of completion of the Teflon flocculation is difficult to control and to reproduce with different carbons and even with different batches of the same carbon. Also, the more dilute the Teflon dispersion, the more stable it is, and the more difficult it is to floc it with carbon alone.

Thus, variations in carbon, platinum-content and/or Teflon concentration cause the colloid to floc more or less rapidly and completely. It is therefore not surprising that in the absence of elaborate quality control, such flocculation is erratic, and often slow, taking half an hour and more in the routine production of repeated batches of the novel electrocatalyst-Teflon mixture, making production not only costly in time and materials, but also resulting in irreproducible and often inferior electrocatalyst-Teflon mixtures.

We have now found that the flocculation process can be controlled, accelerated and brought to complete within less than 5 minutes by dissolving in an aqueous 15 Å–25 Å platinum-on-carbon electrocatalyst suspension which is contacted with a Teflon dispersion, small amounts of sufficiently water-soluble salts of metallic polyvalent cations, such as salts of $Fe^{++}$, $Fe^{+++}$, $Ca^{++}$, $Mg^{++}$, $La^{+++}$, $Ce^{+++}$, $Al^{+++}$, $Zr^{++++}$ and $Th^{++++}$ and rare earth metal cations. With 15 Å–25 Å platinum-on-carbon electrocatalysts containing between 5% and 25% Pt and with colloidal Teflon being present at concentrations between 1.5 and 3.0 g/l, the polyvalent salt concentration of the suspension is preferably between $10^{-3}$–$10^{-6}$ m. As is known in the art, suitable electrocatalyst-to-Teflon ratios are between 3 to 7 and 7 to 3.

Platinum-rich carbons and/or dilute Teflon dispersions, require a salt concentration at the high end of the above concentration range, whereas low salt concentrations suffice for the lower platinum contents of the electrocatalyst and/or for more concentrated Teflon dispersions. In all cases, the resulting electrocatalyst-Teflon mixture is substantially uniform and reproducible in composition. Further, said mixture is easily separated from the clear supernatent, as by decantation or filtration through a coarse filter, without significant loss of residual Teflon in the supernatent. The separated electrocatalyst Teflon mixture is then applied to a conducting substrate such as a carbon paper or nickel screen or the like, by conventional means.

It is important to note that, in the absence of carbon, the dissolved polyvalent cations in the above concentration range do not cause flocculation of the Teflon dispersion. While we do not wish to be held to any interpretation, it is plausible to assume that partial adsorption of the non-ionic stabilizer, for example Triton X-100, onto the carbon renders the colloidal Teflon particles susceptible to the coagulating action of the polyvalent cation. Whatever the mechanism, the synergistic effect of the simultaneous presence of carbon and polyvalent cation is striking and highly beneficial.

Further, it is important to note that divalent ions, such as $Ca^{++}$, $Mg^{++}$, $Fe^{++}$ and the like are effective coagulation agents for the purpose of this invention whereas they are unsuitable for the purpose of Stonehart and Kohlmayr (U.S. Ser. No. 696,334) referred to above.

A preferred simple procedure of the invention utilizing several different polyvalent cations is illustrated in the following example.

In the first (control) experiment 120 mg of the 15 Å–25 Å platinum-on-carbon electrocatalyst prepared in accordance with the first example of our British Patent 1,357,494 and containing 20% Pt was suspended in 60 ml of water at about 38° C. A sample of Teflon dispersion made by the DuPont Co. and identified as "Teflon 30" was diluted with water in the ratio of 1 part of Teflon 30 by volume to 10 parts of water. According to the maker, Teflon 30, as received, contains 60% by weight of tetrafluoro polyethylene resin colloidal particles 0.05 to 0.5 microns in size, and is stabilized with about 6% weight (based on weight of resin) of Triton X-100.

1.5ml of the diluted Teflon dispersion (containing 80 grams/liter of colloidal Teflon) was added to the platinum-on-carbon suspension and the mixture was stirred continuously, except for brief periodic interruptions, permitting settling and examination of the supernatent liquid. At the end of 10 minutes of stirring, the supernatent remained "hazy" due to incomplete floccing of Teflon. The term "hazy" used herein refers to partially coagulated Teflon dispersion, where haziness is caused by residual colloidal Teflon, in amount between one quarter and one third of the original colloidal Teflon in the dispersion. Further clarification of such hazy dispersions in the absence of polyvalent cations, corresponding to complete flocculation, is very slow and variable, requiring up to almost an hour.

The experiment was repeated, except that in each of the following experiments a sample of a salt solution containing a polyvalent cation was added to the platinum-on-carbon catalyst suspension in water, prior to the addition of the Teflon dispersion, as follows:

2nd experiment
  3.0cc of $10^{-2}$ molar $Ca^{++}$ as $CaSO_4$
3rd experiment
  1.0cc of $10^{-2}$ molar $Fe^{++}$ as $FeSO_4$
4th experiment
  1.0cc of $10^{-2}$ molar $La^{+++}$ as $La_2(SO_4)_3$
5th experiment
  0.1cc of $10^{-2}$ molar $Fe^{+++}$ as $Fe_2(SO_4)_3$
6th experiment
  0.1cc of $10^{-2}$ molar $Th^{+4}$ as $th(NO_3)_4$ In all cases, the supernatent was clear after 2 minutes of stirring showing that flocculation was complete and rapid. In a 7th experiment 1.0cc of $10^{-2}$ molar $Al^{+++}$ as $Al_2(SO_4)_3$ needed 3 minutes for complete flocculation. The electrocatalyst-Teflon mixture was then separated rapidly from said clear supernatent as by decantation or filtration through a coarse filter with pore size far in excess of the 0.45$\mu$ Millipore filter used by Stonehart and Kohlmayr (U.S. Ser. No. 696,334).

The fuel cell performance of electrodes comprising the electrocatalyst-Teflon mixtures prepared in experiments 2–7 was substantially and consistently that given in our above mentioned British Patent. Other polyvalent cations, including $Mg^{++}$ as $MgSO_4$ and $Zr^{++++}$ as $Zr(SO_4)_2$ have also been used with similar results.

When the above seven experiments were repeated with a 15 Å–25 Å platinum-on-carbon electrocatalyst containing only 10% Pt, prepared in accordance with example 4 of our British Patent No. 1,357,494, salt concentrations of two orders of magnitude below the above were sufficient to flocculate the Teflon dispersion completely in less than five minutes. Similarly, when the latter electrocatalyst was suspended in 20 ml of water (instead of 60 ml) and 1.5 ml of the Teflon dispersion (containing 80 g/l of colloidal Teflon) was added thereto, salt concentrations between $10^{-5}$ to $10^{-6}$ molar were sufficient to cause complete Teflon flocculation in less than 5 minutes.

In general, we have found it advantageous to select polycations which are substantially rejected, i.e. not adsorbed by the 15 Å–25 Å platinum-on-carbon-Teflon mixture. This selection avoids introducing extraneous and unnecessary matter into the electrodes formed from said mixture. $La^{+++}$, in the form of a solution of a Lanthanum salt such as $La_2(SO_4)_3$, is a preferred trivalent cation to aid Teflon uptake because it cannot be reduced to the metal or change oxidation state in the fuel cell and because it is not adsorbed by Teflon or the electrocatalyst. In fact, in the preparation of the electrocatalyst-Teflon mixture the added $La^{+++}$ is substantially rejected, whereas in the case of $FE^{+++}$ for example, 75% of the added trivalent iron is adsorbed. Similarly, $Ce^{+++}$, the trivalent rare earth cations and divalent ions including $Ca^{++}$ and $Mg^{++}$ are not adsorbed by the novel electrocatalyst-Teflon mixture and are thus also preferred cations.

The invention is applicable to a wide variety of 15 Å–25 Å platinum-on-carbon electrocatalysts and to many other dissolved polyvalent cations; such modifications will occur to those skilled in this art and are considered to fall within the scope of the invention as defined in the appended claims.

What is claimed is:

1. In the method of producing reproducibly a fuel cell electrode comprising a substantially uniform mixture of a finely divided 15 Å–25 Å platinum-on-carbon electrocatalyst comprising platinum particles substantially all in the range of 15 Å–25 Å in size, and finely divided fluorinated hydrocarbon resin, the steps of forming an aqueous suspension of the said electrocatalyst with a sufficiently water-soluble ionizable salt of a polyvalent metallic cation in an amount between $10^{-3}$ and $10^{-6}$ gram-moles of salt per liter of suspension and mixing therewith an aqueous colloidal dispersion of said resin, rapidly to coagulate the mix without substantially affecting the finely divided 15 Å–25 Å platinum-on-carbon electrocatalyst performance, thereby causing said colloidal resin to flocculate substantially completely and at a controlled rapid rate and in substantially uniform admixture with said electrocatalyst in less than five minutes.

2. The method of claim 1, and in which said mixture is separated from the clear substantially resin-free supernatent and then applied to a conducting substrate.

3. The method of claim 1 wherein said polyvalent cation is selected from the group substantially not adsorbed by said mixture during said resin flocculation.

4. The method of claim 1 wherein said polyvalent cation is selected from $La^{+++}$, $Ce^{+++}$ and trivalent rare earth cations.

5. The method of claim 1 wherein said polyvalent cation is divalent.

6. The method of claim 1 wherein said polyvalent cation is selected from Calcium and Magnesium.